United States Patent
Grimsrud et al.

(10) Patent No.: US 7,000,077 B2
(45) Date of Patent: Feb. 14, 2006

(54) DEVICE/HOST COORDINATED PREFETCHING STORAGE SYSTEM

(75) Inventors: Knut S. Grimsrud, Forest Grove, OR (US); Amber D. Huffman, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 10/099,691

(22) Filed: Mar. 14, 2002

(65) Prior Publication Data

US 2003/0177314 A1    Sep. 18, 2003

(51) Int. Cl.
*G06F 12/00*    (2006.01)
(52) U.S. Cl. ............... 711/137; 711/204; 711/213; 712/207; 712/237
(58) Field of Classification Search ............... 711/137, 711/204, 213; 712/207, 237
See application file for complete search history.

(56) References Cited

U.S. PATENT DOCUMENTS

| | | | | |
|---|---|---|---|---|
| 5,410,653 A | * | 4/1995 | Macon et al. | 711/137 |
| 6,449,696 B1 | * | 9/2002 | Okayasu | 711/137 |
| 6,633,957 B1 | * | 10/2003 | Bates et al. | 711/137 |

* cited by examiner

*Primary Examiner*—Donald Sparks
*Assistant Examiner*—Bao Q. Truong
(74) *Attorney, Agent, or Firm*—Paul E. Steiner (57) ABSTRACT

A system including a data requester and a storage system. The storage system determines which prefetch data to include with demand data, without the data requester specifying the prefetch data, and provides information enabling the data requestor to discern the demand data from the prefetch data. The data requestor can be a disk drive driver which copies the demand data in fulfilling an operating system request, and then caches the prefetch data. The storage system can be a disk drive.

39 Claims, 6 Drawing Sheets

DEVICE/HOST COORDINATED PREFETCHING STORAGE SYSTEM

BACKGROUND OF THE INVENTION

1. Technical Field of the Invention

This invention relates generally to data storage systems, and more particularly to a storage system in which prefetching decisions are made by the storage device, taking advantage of information which the storage device has but which the host is unlikely to have, such as rotational position or what data are already cached by the storage device.

2. Background Art

Prefetching can improve system performance, by making data available earlier or faster than would be the case without prefetching. The greater the differences between the rates at which data can be read from a mass storage device such as a hard disk, and the rates at which that data can then be transferred to the processing system, the greater the benefit from prefetching. The more intelligently the prefetching is performed, the more benefit it will offer.

Figure 1:
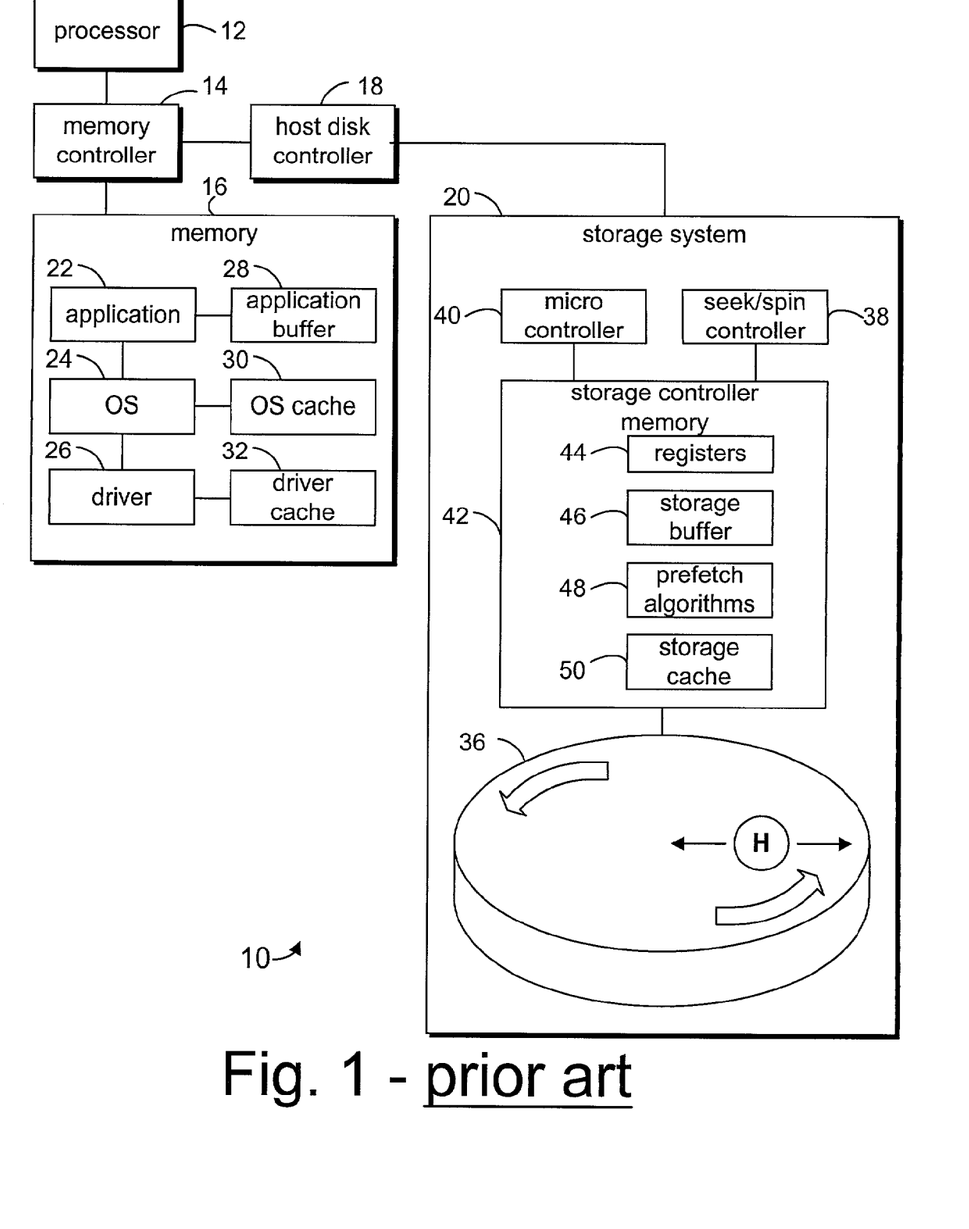
FIG. 1 shows a data processing system according to the prior art, including its storage system.

FIG. 1 illustrates a data processing system 10 such as is typical in the prior art. The system includes a processor 12 for performing logic operations of the system, a memory controller 14 for interfacing the processor to a memory 16 such as one or more subsystems of dynamic random access memory (DRAM), static random access memory (SRAM), read only memory (ROM), programmable read only memory (PROM), flash memory, and the like. The system further includes a host disk controller 18 for interfacing to a storage system 20 such as one or more of a hard disk drive (HDD), compact disc read only memory (CD-ROM), floppy disk drive, digital video disc (DVD), or the like, or even non-rotating storage such as a tape drive or a solid state bulk storage system.

The memory typically includes an application program 22 which performs operations desired by a user. The application runs on an operating system (OS) 24 which provides a higher-level abstraction and collection of routines for performing operations of the system, such as requests to open a file on the storage system. The memory typically also includes one or more drivers customized for operating various hardware systems of the data processing system, including a host storage driver 26 for the particular storage system.

When the application wants to, for example, read a portion of a file from the storage system, the application allocates an application buffer 28 which is an area of memory in which the requested data are to be stored. After allocating the application buffer, the application issues an OS call identifying the requested data and indicating the address of the application buffer to which the data are to be retrieved. If the OS has previously cached the requested data in an OS cache 30, such as a file system cache, the OS will simply copy the data from the OS cache to the application buffer and tells the application that the data retrieval has succeeded. If the requested data are not in the OS cache, the OS issues a call to the host storage driver. The driver may maintain a driver cache 32 and, if the requested data are found in the driver cache, the driver copies the requested data directly from the driver cache into the application buffer.

The storage system includes a storage drive 36 which may be any suitable mechanism such as one or more rotating hard disk platters, CD-ROM platters, DVD platters, and so forth, and/or one or more non-rotating mechanisms such as tape drives, solid state memory devices, and the like. The storage drive may include one or more data read devices such as a hard disk head mechanism (generally shown as "H"). The storage system includes one or more controllers such as a spin/seek controller 38 for controlling the various storage drives.

The storage system also includes a microcontroller 40 for performing logic operations of the storage system, and a storage controller memory 42 for holding data used in those logic operations. The storage controller memory may include registers 44 for passing parameters to or from the driver, and a storage buffer 46 through which requested data are delivered. The storage system may include a variety of prefetch algorithms 48 which the microcontroller executes in attempting to improve overall system performance by intelligently guessing which data are likely to be requested in the near future. The microcontroller can store prefetched data in a storage cache 50. Then, if that data is subsequently requested by the driver, the data can be transferred at the interface rate of the host disk controller, rather than at the typically much slower transfer rate of the storage drive, and without waiting for the head to seek to the correct cylinder and the platter to rotate to the correct sector.

Data actually requested may be termed "demand data", and speculatively prefetched data may be termed "prefetch data".

Figure 2:
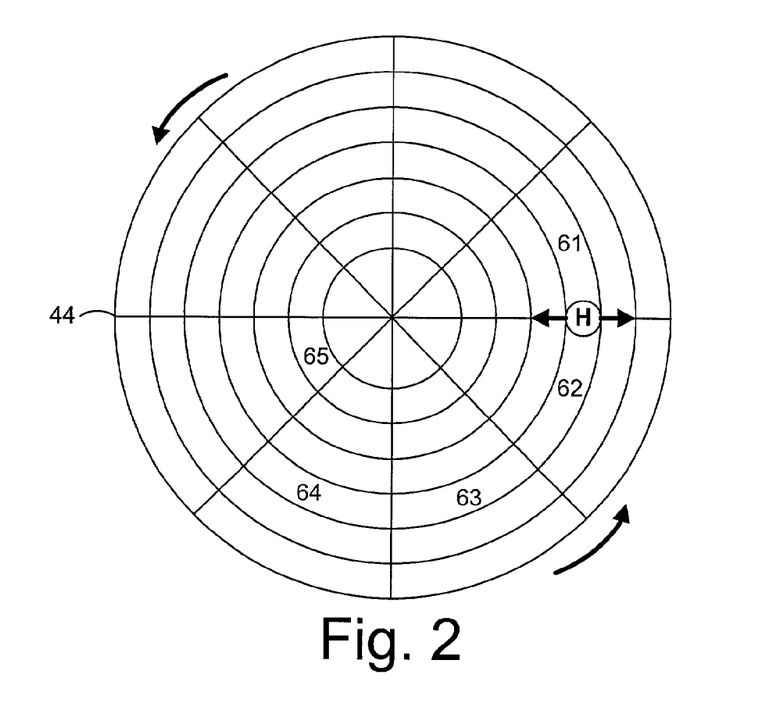
FIG. 2 shows a simplified view of a rotating storage device, illustrating locations of demand request blocks and prefetch blocks.

FIGS. 1 and 2 illustrate operation of the storage system. The seek/spin controller moves the head to the correct cylinder of the platter. At some time during the next full rotation of the platter, the requested block will pass beneath the head and be read into the storage buffer.

Unfortunately, existing prefetch schemes are either completely host driven or completely device driven, with no coordination between the host and the device. The host storage driver or the OS determines that some particular data, such as block 63 are likely to be needed next, and issues a "prefetch request". If, while the storage system is servicing this prefetch request and is, for example, waiting for the disk to rotate to the correct track, the host issues a demand request for a different block, the demand request will be stalled until the prefetch request has been completed. This is especially problematic in systems in which the storage accesses are largely non-sequential, such as Windows desktop workloads.

Another problem can arise in prefetching schemes which automatically expand the scope of demand data requests to include prefetch data. These prefetch data are typically data which are previous and/or subsequent blocks contiguous to the demand blocks. If the host gets lucky, there is no problem. Often, however, the previous (prefetch) blocks may have started rotating past the head moments before the head was in position to read them; for example in FIG. 2 if the demand request block is block 62 and the driver decides to also fetch blocks 61 and 63 as prefetch data. The result is that the device disk controller will have to wait nearly a complete revolution of the platter before it can begin reading the data, which begins with block 61 that has just passed the head, even though the demand request block 62 itself has not yet begun passing the head. In this instance, the prefetch is very negatively efficient.

Yet another problem can arise when the host storage driver has asked for a prefetch block which is logically mapped to a physical block (such as block 64) which is "bad" and which has been remapped by the storage system to a different location (such as block 65) that is unknown to the host. Any requests to such blocks are likely to cause delays, because they are likely to mean moving the head to a different track, perhaps one far removed from the track of the demand request block.

Still another problem can arise when the host storage driver asks for prefetch data that go beyond the end of the current track and causes the request to cross a cylinder boundary. This causes a head seek and results in a negatively efficient prefetch.

In any of these situations, if the host storage driver had known more information about the state of the storage system, such as which track and sector the head were at, or which data were already in the storage cache, it might not have issued the prefetch request, or may have modified it, or may have delayed it.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 3:
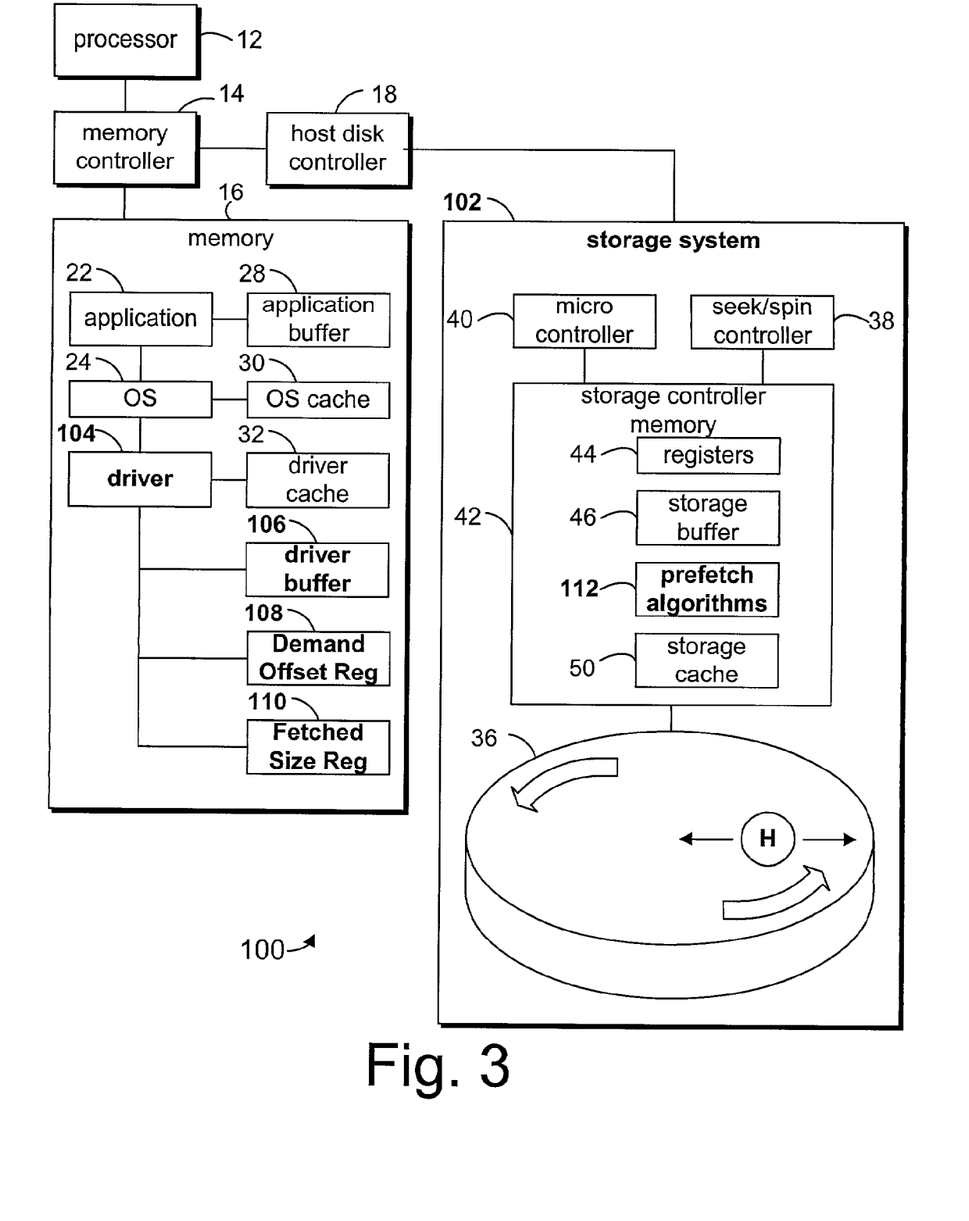
FIG. 3 shows one embodiment of a data processing system according to this invention.
Figure 4:
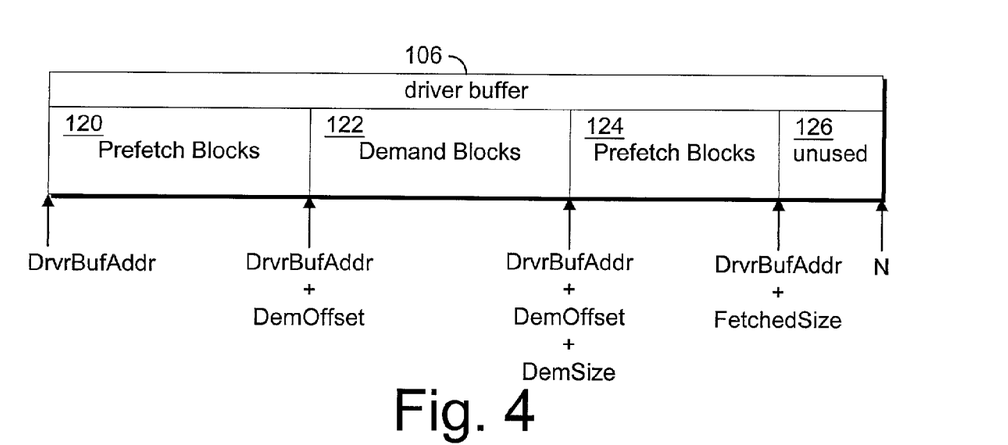
FIG. 4 shows one embodiment of a host disk buffer and associated registers.

FIGS. 3 and 4 illustrate one exemplary embodiment of a system 100 according to this invention. The decision of what prefetch data to return, if any, can be made by the enhanced storage system 102 rather than solely by the host. Because the driver 104 or other host entities may not know beforehand whether prefetch data will be returned with the demand data, nor how much prefetch data, nor where the prefetch data and demand data are in the driver buffer 106, the system includes a mechanism for the storage system to provide this information.

In one embodiment of the invention, a demand offset register 108 is set by the storage system to indicate where in the driver buffer the demand data begins, and a fetched size register 110 is set by the storage system to indicate how much data (prefetch and demand) was returned into the driver buffer. In various embodiments, these registers may reside in various locations, such as in the host memory 16, or in the storage controller memory 42, or other suitable location. In other embodiments, the identifying information specifies the prefetch data, rather than the demand data; thus the demand data are specified indirectly.

The storage system may have returned one or more prefetch blocks 120 (such as block 62 of FIG. 2) which are sequentially prior to one or more demand blocks 122 (such as block 63 of FIG. 2), and one or more prefetch blocks 124 (such as block 64 of FIG. 2) which are sequentially after the demand blocks. These blocks may or may not have completely filled the driver buffer; if not, there will be an unused area 126 in the driver buffer.

The beginning address (DrvrBufAddr) of the driver buffer 106 is predetermined, in some embodiments. In other embodiments, the driver buffer can be dynamically allocated, and located via a pointer, for example. The beginning of the demand data can, in one embodiment, be found by adding the beginning address of the driver buffer and the effective value (DemOffset) of the demand offset register. In some embodiments, the offset, size, and so forth are specified in bytes, while in other embodiments, they are specified in sectors; the address calculations are made taking this into account. The end of the demand data is determined by adding the demand size to the address of the beginning of the demand data, minus one. Summing the address of the driver buffer, the demand offset, and the demand size gives the starting address of the prefetch data that follows the demand data. Summing the driver buffer address and the contents of the fetched size register (FetchedSize) minus one gives the end of the prefetch data.

Other buffer indexing or addressing schemes are, of course, readily available. For example, a table could be generated by the storage system, such as the following:

<block offset><block type>
<block offset><block type>
<block offset><block type>
. . .
<block offset><block type>
<end marker> in which a <block offset> is an offset from the start of the driver buffer (or, alternatively, an actual address in the memory), a <block type> indicates whether the block is prefetch data or demand data, and the <end marker> indicates the end of the table. As another alternative, the table could be implemented as linked list. These and other possibilities are well within the abilities of ordinary skilled storage engineers, and will be appreciated upon having the teachings of this disclosure.

With an enhanced host driver in place, the storage system can utilize improved prefetching algorithms 112. This is especially true in embodiments in which the driver and storage system are adapted to recognize a "fetch" instruction which is distinct from a normal "read" instruction. In some such embodiments, the fetch instruction may simply be a degenerate case of the read instruction in which no (null) demand data are specified.

The improved prefetch algorithms are able, because they reside in the storage system rather than in the host, to take advantage of improved knowledge about the state of the storage system. For example, if the host has asked for demand block 63, and the prefetch algorithms determine that the platter rotation has already passed potential prefetch block 61 when the head arrives in the correct track, the prefetch algorithm can begin prefetching with block 62 instead of block 61. Similarly, if the host has asked for demand block 63, and the prefetch algorithms determine that blocks 63 and 64 are already in the storage cache, the storage system can immediately return demand block 63 and prefetch block 64 at the interface rate, and not wait for any additional data from the storage drive. Or, if the host has asked for demand block 63, and demand block 63 must be retrieved from the storage drive, the prefetch algorithms can determine that prefetching should not include block 64 because block 64 has been remapped to block 65, which would cause a long delay for head seek.

In general, when the demand data must be read from the storage drive, prefetch blocks that are prior to the demand blocks (relative to the rotation of the storage drive) can essentially be prefetched at no cost, as long as the head has not passed them when it becomes ready to read in the correct track. Typically, the interface will be available, and these prefetched blocks can be transferred to the host at the media rate before the demand blocks even become available at the head. However, prefetch blocks that are after the demand blocks (relative to the rotation) cannot be prefetched for free, as they are not available until after the demand blocks have already been read. Any extra time spent waiting for them to become available from the storage drive is additional delay before the host can be informed that the transfer is complete, and before the fetched size register can be written. In some scenarios, it may nevertheless be desirable to prefetch them. Also, if these later prefetch blocks are available in the storage cache, they may be sent nearly for free, with only enough additional delay incurred per the interface rate limit.

The "fetch" command can be used even in the absence of any demand data request. It essentially tells the storage system "if you have prefetched or cached data that you think might be useful to me, go ahead and send them". It will be especially advantageous to respond to "fetch" requests using only data that are in the storage cache or storage buffer, and not data that must be read from the drive, so the request can be fulfilled at the interface rate and completed much earlier than if the drive were read.

In another embodiment, the storage system returns prefetch data that are not contiguous with the demand data. Ideally, this prefetch data will already be in the storage cache, so no extra seek/spin delay is incurred.

The host and the storage system may be termed a "data requestor" and a "data source", respectively.

Figure 5:
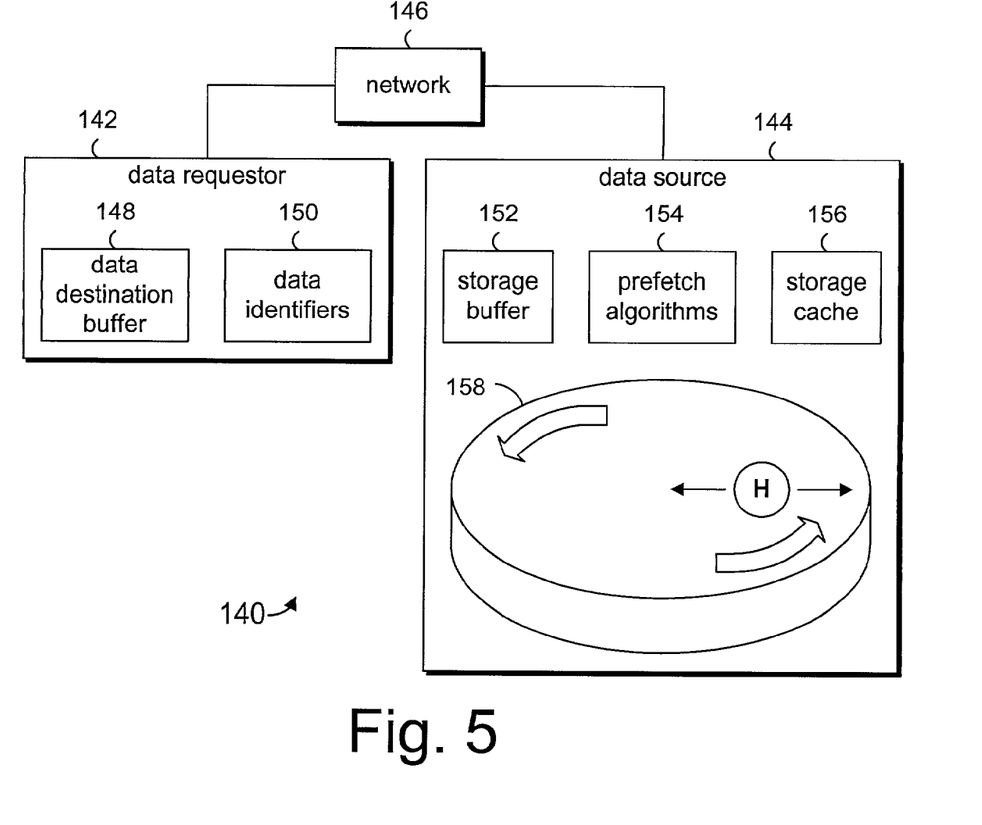
FIG. 5 shows another embodiment of the invention.

FIG. 5 illustrates another embodiment of a system 140 according to this invention, and more particularly illustrates that the invention is not necessarily limited to local host environments such as a personal computer and its directly attached disk drive. The system 140 includes a data requestor 142 coupled to a data source 144 over a communication link 146. The data requester can be any entity which requests data from storage, such as a personal computer, a server, a home appliance, a website, a cellular telephone, and so forth. The data source can be any entity which stores requestable data, such as a server, a website, a disk drive, a memory subsystem, a network-attached storage (NAS) apparatus, and so forth. The communication link connecting them can be one or more of any suitable data communication means, such as a local area network (LAN), a wide area network (WAN), a wireless link, Ethernet, a cellular telephone system, a telephone system, a circuit-switched network, a packet-switched network, satellite, laser, fiber optic, the internet, and so forth.

The data requestor includes a data destination buffer 148 (corresponding roughly to the driver buffer of FIG. 3, for example) and storage 150 (corresponding roughly to the demand offset register and fetched size register of FIG. 3, or the table indicated above, for example) for one or more data identifiers which enable the data requestor to sort out the various parts of prefetch data and demand data received from the data source. The data source includes a storage buffer 152 (corresponding roughly to the storage buffer of FIG. 3), one or more prefetch algorithms 154 (corresponding roughly to the prefetch algorithms of FIG. 3), a storage cache 156 (corresponding roughly to the storage cache of FIG. 3), and a storage drive 158 (corresponding roughly to the storage drive of FIG. 3).

The data requestor issues a "read" command or a "fetch" command, and the data source responds with prefetch data and/or demand data as determined by the prefetch algorithms and the state of the data source (which is typically unavailable to the data requestor, at least in a meaningful time frame).

In some embodiments, the storage system may "push" prefetch data without being asked by the host or data requester, such as through a direct memory access (DMA) protocol.

Figure 6:
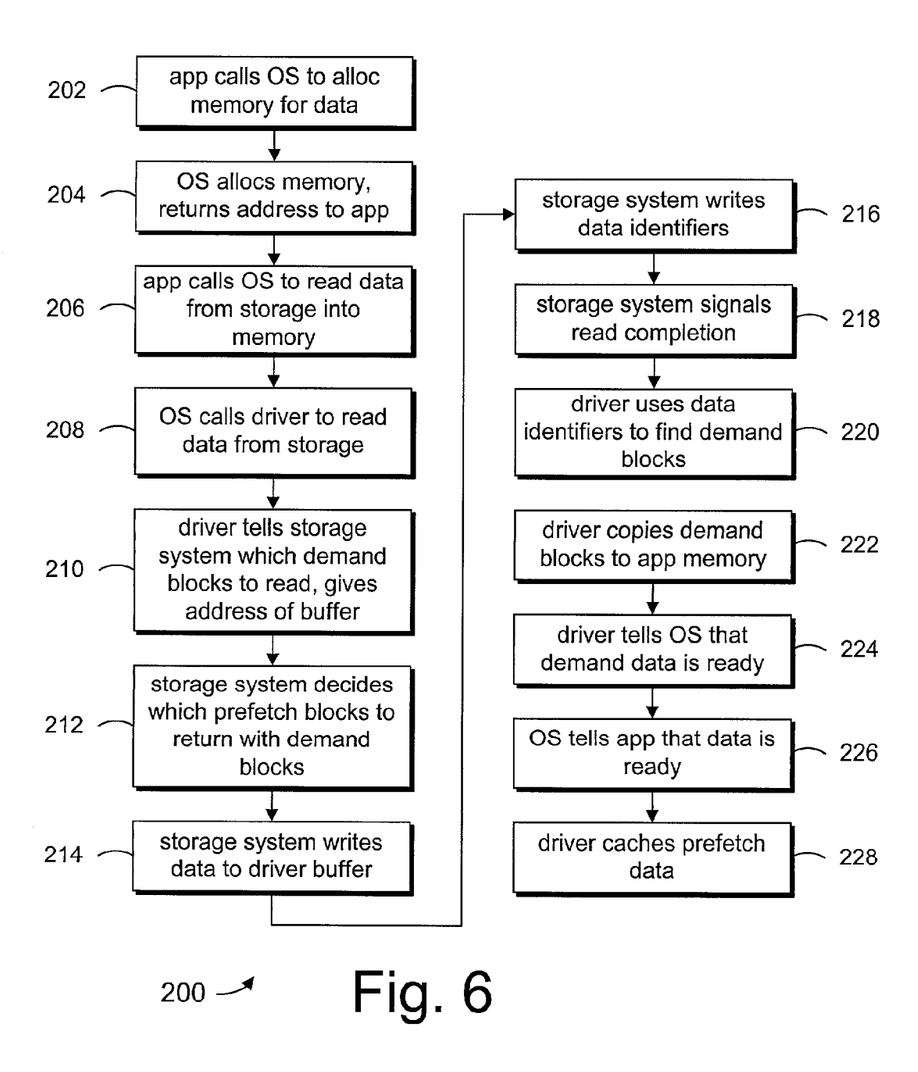
FIG. 6 shows a flowchart of one embodiment of a method of operation of this invention.

FIG. 6 illustrates one exemplary method 200 of operation of a system constructed according to the principles of this invention. The application calls (202) the OS to allocate memory for data. The OS allocates (204) the requested size of memory area, and returns the address of the allocated memory to the application. The application calls (206) the OS to read data into that memory from the storage system. The OS calls (208) the driver to read the data from the storage system, and provides the address of the allocated memory to the driver. The driver tells (210) the storage system which demand blocks to read, and gives the storage system the address of the driver's buffer memory. The storage system decides (212) which blocks to prefetch and return with the demand blocks, according to the prefetch algorithms and state of the storage system. The storage system writes (214) the resulting data blocks to the driver's buffer. The storage system writes (216) the data identifiers (such as the demand offset register and the fetched size register), and signals (218) the driver that the data read has been completed. The driver uses (220) the data identifiers to find the demand blocks in the buffer, and copies (222) the demand blocks to the application's allocated memory location. The driver tells (224) the OS that the demand data is ready, and the OS tells (226) the application that the data is ready. While the application uses the demand data, the driver is free to take care of various housekeeping operations, including caching (228) any prefetch data blocks that were returned with the demand data blocks.

Figure 7:
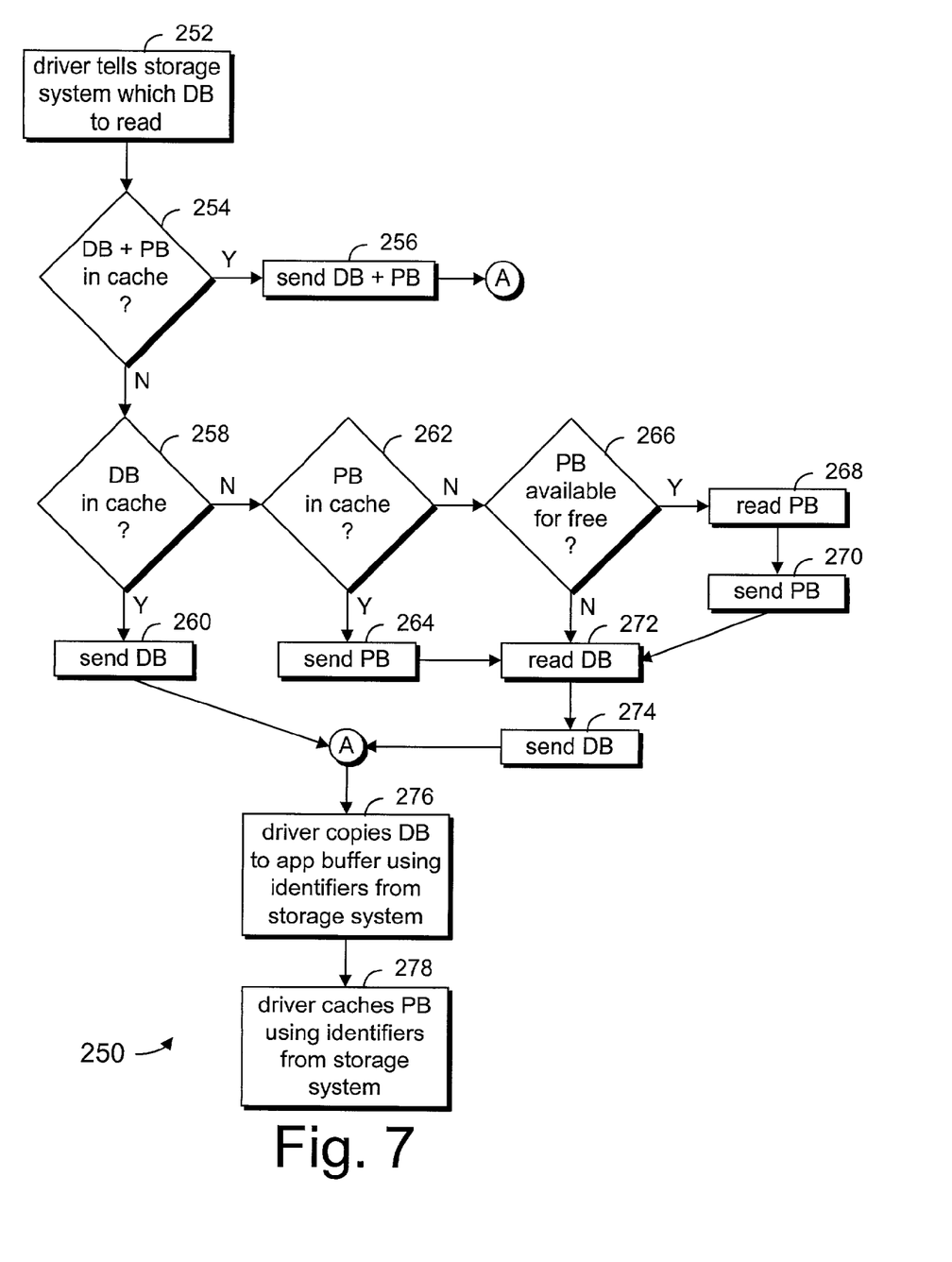
FIG. 7 shows a flowchart of another embodiment of a method of operation of this invention.

FIG. 7 illustrates another method 250 of operation of a system according to the invention. The driver tells (252) the storage system which demand blocks (DB) to read. If (254) the storage system determines, by its prefetch algorithms, that both the demand blocks and the prefetch blocks (PB) are already in the storage cache, the storage system sends (256) them to the driver. Otherwise, if (258) the demand blocks are already in the storage cache, only the demand blocks are sent (260) to the driver. If not, then if (262) the prefetch blocks are in the storage cache (but the demand blocks are not), the storage system sends (264) the prefetch blocks. But if the prefetch blocks are not cached, if (266) they are available for free (or at an acceptable penalty, per the prefetch algorithms), the prefetch blocks are read (268) from the drive storage and are sent (270) to the driver. Then, the data blocks are read (272) from the drive storage and sent (274) to the driver. After ("A") the storage system sends whatever data are to be sent, the driver copies (276) the demand blocks to the application's allocated memory buffer, using the identifiers provided by or retrieved from the storage system. Then, the driver caches (278) any prefetch blocks that were sent, again using the identifiers.

The reader should appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc. form, and/or the instructions etc. together with their storage or carrier media. The reader will further appreciate that such instructions etc. may be recorded or carried in compressed, encrypted, or otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   a data requestor which has the ability to specify demand data that it wants and to receive reply data including the demand data and optionally also unspecified prefetch data;
   a communication link; and
   a data source coupled to the data requestor over the communication link and which has the ability to determine which prefetch data to send to the data requestor with the demand data, wherein
   the data requestor comprises a driver; and
   the data source comprises a storage system.

2. The apparatus of claim 1 wherein the storage system comprises:
   a rotating storage drive.

3. The apparatus of claim 2 wherein:
   the data requestor further comprises a data destination buffer; and
   the data source further has the ability to write the prefetch data and the demand data into the data destination buffer, and the ability to provide data identifiers which enable the data requestor to selectively retrieve the demand data from the data destination buffer.

4. The apparatus of claim 3 wherein the apparatus comprises a computer.

5. The apparatus of claim 1 wherein the communication link comprises a local area network.

6. The apparatus of claim 1 wherein the communication link comprises a wide area network.

7. The apparatus of claim 1 wherein the communication link comprises the internet.

8. The apparatus of claim 1 wherein the communication link comprises a host disk controller.

9. The apparatus of claim 1 wherein the prefetch data are stored contiguously with the demand data in a storage device of the data source.

10. An apparatus comprising:
    a data requestor which has the ability to specify demand data that it wants and to receive reply data including the demand data and optionally also unspecified prefetch data;
    a communication link; and
    a data source coupled to the data requestor over the communication link and which has the ability to determine which prefetch data to send to the data requestor with the demand data,
    wherein the data requestor specifies null demand data.

11. A storage system for responding to a demand data request from a data requestor, the storage system comprising:
    a controller for performing logic operations of the storage system;
    a storage drive coupled to the controller;
    a storage cache coupled to the controller; and
    at least one prefetch algorithm executable by the controller to determine which prefetch data to include with demand data in a response to the demand data request, and to retrieve the prefetch data and the demand data from at least one of the storage drive and the storage cache, and to provide to the data requestor reply data including the prefetch data and the demand data,
    wherein the demand data request specifies null demand data.

12. A storage system for responding to a demand data request from a data requestor, the storage system comprising:
    a controller for performing logic operations of the storage system;
    a storage drive coupled to the controller;
    a storage cache coupled to the controller; and
    at least one prefetch algorithm executable by the controller to determine which prefetch data to include with demand data in a response to the demand data request, and to retrieve the prefetch data and the demand data from at least one of the storage drive and the storage cache, and to provide to the data requestor reply data including the prefetch data and the demand data,
    wherein the prefetch data are contiguous with the demand data on the storage drive, and wherein the prefetch data include first prefetch data which are stored prior to the demand data and second prefetch data which are stored after the demand data on the storage drive.

13. The storage system of claim 12 wherein the reply data further include information enabling the data requestor to select the demand data from the reply data.

14. A storage driver for execution by a data requestor to retrieve demand data from a storage system, the storage driver comprising:
means for identifying the demand data to the storage system;
means for receiving reply data from the storage system, in which the reply data includes the demand data and potentially also prefetch data which was not identified by the storage driver;
means for selectively retrieving the demand data out of the reply data;
means for selectively retrieving the prefetch data out of the reply data;
means for caching the prefetch data; and
means for receiving an offset into the reply data at which the demand data is located.

15. The storage driver of claim 14 further comprising:
means for receiving an indication of how much reply data has been received from the storage system.

16. The storage driver of claim 15 wherein the storage system comprises a disk drive and the storage driver comprises disk drive driver software executable by a microprocessor of a computer system which is connected to the disk drive.

17. A storage driver for execution by a data requestor to retrieve demand data from a storage system, the storage driver comprising:
means for identifying the demand data to the storage system;
means for receiving reply data from the storage system, in which the reply data includes the demand data and potentially also prefetch data which was not identified by the storage driver; and
means for selectively retrieving the demand data out of the reply data,
wherein the means for selectively retrieving the demand data is adapted to retrieve the demand data from between first prefetch data stored below the demand data and second prefetch data stored above the demand data in the means for receiving reply data.

18. A method comprising:
a driver requesting specified demand data from a storage system;
the storage system determining which prefetch data to include with the demand data and;
the driver receiving from the storage system,
the demand data, and
the prefetch data,
wherein the storage system determines which prefetch data to include, based at least in part on a state of the storage system,
and wherein the state comprises whether the prefetch data is already in a storage cache in the storage system.

19. The method of claim 18 wherein the state further comprises whether the prefetch data can be retrieved from a storage drive with an acceptable performance penalty.

20. A method comprising:
a driver requesting specified demand data from a storage system;
the storage system determining which prefetch data to include with the demand data; and
the driver receiving from the storage system,
the demand data, and
the prefetch data; and
the driver receiving from the storage system information identifying where, within reply data that includes the demand data and the prefetch data, the demand data is located,
wherein the storage system provides, in the information, a demand data offset and a reply length.

21. The method of claim 20 wherein the driver and the storage system are connected by a communication link.

22. The method of claim 21 wherein the communication link comprises the internet.

23. The method of claim 22 wherein the communication link comprises a local area network.

24. The method of claim 21 wherein the method is performed by a computer system, the driver is executed by a microprocessor of the computer system, the storage system comprises a disk drive system of the computer system, and the communication link comprises a host disk controller interface to the storage system.

25. A method of operating a storage device driver in a processor-based system which includes a storage system, the method comprising:
receiving a first request for demand data;
sending a second request for the demand data to the storage system;
receiving reply data from the storage system;
receiving identifying data from the storage system; and
using the identifying data to selectively retrieve the demand data from the reply data; and
using an offset indicator in the identifying data to identify a beginning location of the demand data in a buffer in which the reply data were received.

26. The method of claim 25 further comprising:
using a reply length indicator in the identifying data to determine how much prefetch data were received from the storage system in the reply data with the demand data.

27. The method of claim 26 further comprising:
caching the prefetch data.

28. The method of claim 25 wherein the reply data comprises prefetch data and the demand data.

29. The method of claim 28 wherein the demand data and the prefetch data are from contiguous areas of storage.

30. The method of claim 28 wherein the demand data and the prefetch data are from discontiguous areas of storage.

31. A method of operating a storage system in conjunction with a data requestor which does not specify how much prefetch data the storage system should return with demand data requested by the data requestor, the method comprising:
sending the demand data to the data requestor;
determining what prefetch data to include with the demand data;
sending the prefetch data to the data requestor; and
providing identifying data to enable the data requestor to discern the demand data from the prefetch data,
wherein the determining what prefetch data to include comprises basing the determination at least in part on a state of the storage system, and
wherein the state comprises whether the prefetch data are cached.

32. The method of claim 31 wherein the state further comprises whether the demand data are cached.

33. The method of claim 32 wherein the state comprises whether the prefetch data can be retrieved from a storage drive before the demand data can.

34. The method of claim 32 wherein the state comprises whether the prefetch data can be efficiently retrieved following the demand data.

35. The method of claim 34 wherein the state comprises whether the prefetch data will cause a head seek.

36. An article of manufacture comprising:
- a machine-accessible storage medium including data that, when accessed by a machine, cause the machine to perform the method of claim 25, and
- using a reply length indicator in the identifying data to determine how much prefetch data were received from the storage system in the reply data with the demand data.

37. The article of manufacture of claim 36 wherein the machine-accessible medium comprises a recordable storage medium.

38. An article of manufacture comprising:
- a machine-accessible storage medium including data that, when accessed by a machine, cause the machine to perform the method of claim 31 and
- wherein the determining what prefetch data to include comprises:
  - basing the determination at least in part on a state of the storage system,
  - wherein the state comprises whether the prefetch data are cached, and
- wherein the state further comprises whether the demand data are cached.

39. The article of manufacture of claim 38 wherein the machine-accessible medium comprises a recordable storage medium.

* * * * *